United States Patent [19]

Grinderslev

[11] Patent Number: 5,088,804
[45] Date of Patent: Feb. 18, 1992

[54] METHOD AND APPARATUS FOR TERMINATING A FIBER-OPTIC CABLE WITHOUT ADHESIVE

[75] Inventor: Soren Grinderslev, Shelton, Conn.

[73] Assignee: Optical Fiber Technologies, Inc., Westford, Mass.

[21] Appl. No.: 378,930

[22] Filed: Jul. 12, 1989

[51] Int. Cl.$^5$ .............................................. G02B 6/36
[52] U.S. Cl. ......................................... 385/81; 385/76
[58] Field of Search .................. 350/96.20, 96.21, 320

[56] References Cited

U.S. PATENT DOCUMENTS

| | | | |
|---|---|---|---|
| 3,946,467 | 3/1976 | Lukas et al. | 24/260 |
| 3,999,837 | 12/1976 | Bowen et al. | 350/96 C |
| 4,107,242 | 8/1978 | Runge | 264/1 |
| 4,140,366 | 2/1979 | Makuch et al. | 350/96.22 |
| 4,167,303 | 9/1979 | Bowen et al. | 350/96.21 |
| 4,190,317 | 2/1980 | Makuch | 350/96.20 |
| 4,236,787 | 12/1980 | Iacono et al. | 350/96.21 |
| 4,354,731 | 10/1982 | Mouissie | 350/96.21 |
| 4,440,471 | 4/1984 | Knowles | 350/96.20 |
| 4,512,630 | 4/1985 | Runge | 350/96.21 |
| 4,607,911 | 8/1986 | Rhodes | 350/96.20 |
| 4,645,296 | 2/1987 | Cattin et al. | 350/96.21 |
| 4,648,688 | 3/1987 | Ashman et al. | 350/96.20 |
| 4,679,895 | 7/1987 | Huber | 350/96.20 |
| 4,747,658 | 5/1988 | Borsuk et al. | 350/96.21 X |
| 4,787,699 | 11/1988 | Moulin | 350/96.20 |
| 4,790,622 | 12/1988 | Levinson et al. | 350/320 |

FOREIGN PATENT DOCUMENTS 0210921 2/1987 European Pat. Off. .
2629925 10/1989 France .

OTHER PUBLICATIONS

Alta Frequenza, vol. L, No. 4, Jul.-Aug. 1981, M. Brenci et al: pp. 223-225, and see whole article.
Patent Abstracts of Japan, vol. 8, No. 109 JP A 5918915 (Matsushita Denko K.K.), 31 Jan. 1984, see the abstract.
International Search Report, dated 20 Dec. 1990 for International Application No. PCT/US90/03964.

Primary Examiner—William L. Sikes
Assistant Examiner—Phan T. Heartney
Attorney, Agent, or Firm—Lahive & Cockfield

[57] ABSTRACT

An adhesiveless optical fiber termination employs an outer element having a through passage that receives an optical fiber. A tubular inner element fits over the cable and telescopically seats in the passage of the outer element. An elastomeric compressive system is seated within the passage substantially encircling the optical fiber and is radially inwardly deformed into secure engagement with the optical fiber therein in response to compressive engagement between the outer element and the inner element.

35 Claims, 3 Drawing Sheets

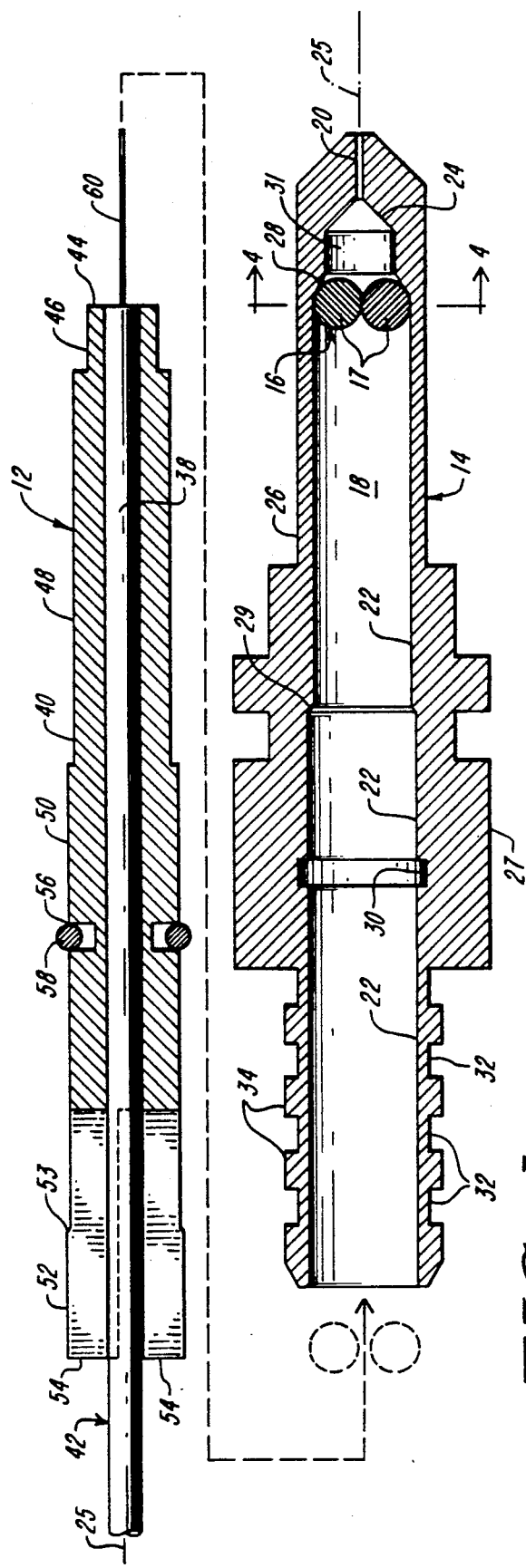
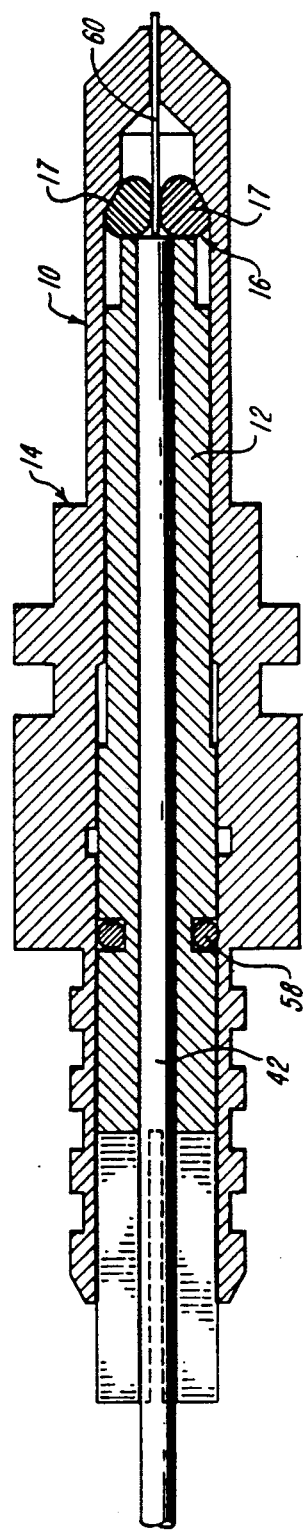

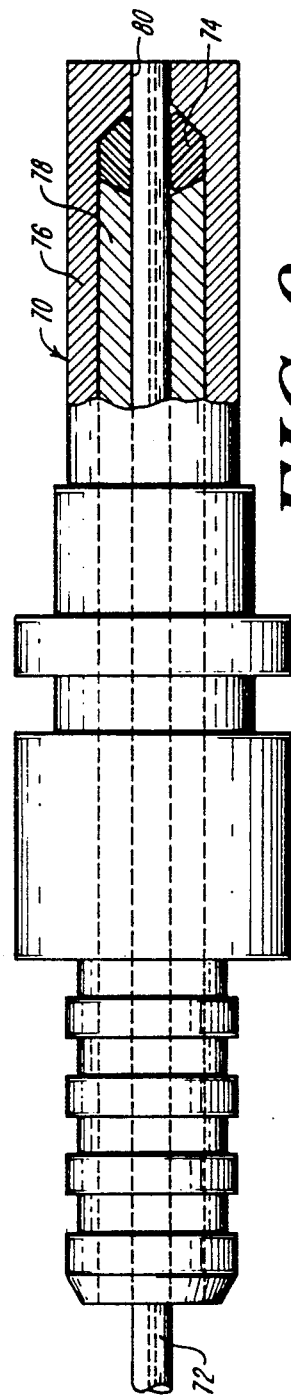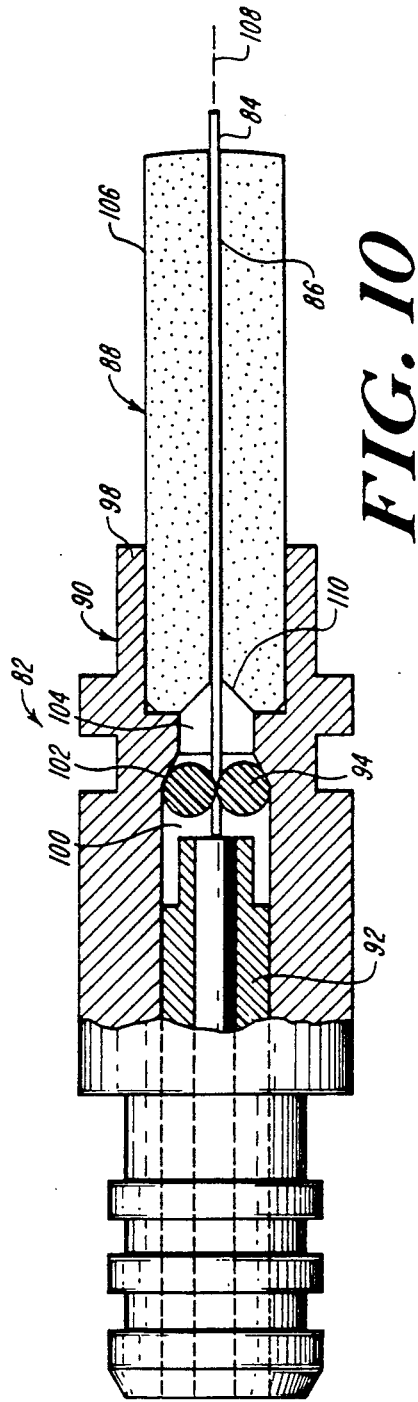

METHOD AND APPARATUS FOR TERMINATING A FIBER-OPTIC CABLE WITHOUT ADHESIVE

BACKGROUND OF THE INVENTION

This invention relates to an apparatus and method for terminating, including joining and splicing, light transmitting signal cables having at least one optical fiber. It relates in particular to an apparatus and method that secure a fiber optic cable by mechanical means, and without the need for an adhesive.

Fiber optic communication cables typically include at least one light transmitting optical fiber clad in an optically insulating material. The cladding protects the glass fiber, and prevents dispersion of light out of the optical fiber. The fiber optic cable usually has a protective external buffer, typically of a plastic material, which may or may not be removed to terminate the cable.

The use of fiber optic systems creates a need for a connector capable of coupling segments of light-conductive cable with minimal detriment to light transmission. To achieve efficient light transfer between fiber optic cables, the optical fibers must be axially and angularly aligned to high precision, as well as spaced close together with or without touching, whichever is specified. The alignment and spacing requirements are exceedingly demanding, due to the minute, micron-size diameter of the optical fibers being connected, coupled or otherwise terminated.

Both mechanical and adhesive clamp systems have been employed to achieve the requisite fiber alignment. Prior mechanical clamps may subject the optical fiber to excessive clamping or gripping pressures causing breakage or damage and, thus, reduced light transmission. Insufficient gripping pressure, on the other hand, permits undesirable movement of the optical fiber. These problems are particularly likely to occur in environments where significant temperature variations cause expansion and contraction, which result in clamping pressure variations.

Prior terminations employing adhesives, like prior mechanical terminations, can provide accurate positioning of the fiber and polishing of its end without displacement. However, one disadvantage of adhesive clamps is that they require the correct application, and subsequent curing, of the adhesive.

It is accordingly an object of this invention to provide an improved method and apparatus for terminating a fiber optic cable by mechanical action, without the need for an adhesive.

It is another object of the invention to provide a method and apparatus for terminating a fiber optic cable with mechanical action an with minimal risk of subjecting the cable to damaging or destructive forces.

It is also an object of the invention to provide a method and apparatus for terminating a fiber optic cable that is uniformly effective under a variety of environmental conditions.

Further objects of the invention include providing a fiber optic cable connector of the above character that is economical to manufacture, easy to use, and that provides a reliable high level optical signal transmission.

Other general and specific objects of the invention will in part be obvious and will in part appear hereinafter.

SUMMARY OF THE INVENTION

The invention attains the foregoing objectives with connector apparatus that includes a terminating element, an actuating element and a compressive system. The apparatus and method of the invention align and terminate an optical fiber such that the secured fiber is concentrically disposed with respect to the outer dimension of the terminating element.

The terminating element is typically a connector outer housing or shell and has a central passage through which a fiber optic cable extends. The actuating element is tubular to fit over the cable and to fit telescopically within a section of the housing passage. The compressive system is a set of one or more resilient elements seated within the housing passage circumferentially about a buffered or unbuffered fiber. Upon assembling the actuating element fully with the terminating element, the compressive system is pressed by the two interfitting elements radially inward to secure the optical fiber in place. The terminating element provides precise centering and alignment of the secured fiber.

More particularly, the terminating element is a hollow body that has an axially extending tubular passage. A shoulder or other radial constriction is closely rearward of a first, forward section of the passage. A second passage section is axially behind the first passage section. The cable length within the second passage section, and correspondingly within the actuating element, typically has the buffer intact. The fiber length within the first passage section is unbuffered in one embodiment, and it is understood can, in another embodiment, be buffered. The terminating element preferably has at least one deflectively acting surface for deflecting the compressive system radially inward during assembly.

The actuating element is a tubular member that telescopically seats over the cable being terminated and that assembles within the passage of the terminating element. It is arranged for engagement with the compressive system to press it into mechanical engagement with the optical fiber. In one embodiment, a compressively acting surface on a first forward end of the actuating element abuts the compressive system for deforming it radially inward. The actuating element hence has a tubular passage concentric with the tubular outer surface of the actuating element and adapted to receive the optical fiber, typically with the buffer layer intact. The actuating element preferably includes a lock element for fixing it in an axial, fully assembled position relative to the terminating element. An optional yet preferred feature of the invention provides a second mechanical engagement onto the buffered cable at the back of the actuating element. This second clamp can employ finger-like clamp members on the axial back end of the actuating element and which are pressed onto the buffered cable by sliding interference with the terminating element.

The compressive system of the illustrated embodiment is disposed within the passage of the terminating element, and arranged to circumferentially about the optical fiber, whether buffered or unbuffered. When radially inwardly deformed, the compressive system compressively engages the optical fiber. The compressive system preferably is closely adjacent to the first, forward section of the terminating element and is axially forward of the actuating element. The compressive system can be a single centrally apertured deformable element. Other embodiments can employ a set of two or more compressive elements. In one embodiment, each compressive element is an elastically deformable, resilient plastic material, preferably with a circular cross-section, and the set or on more of such elements substantially encircles the opting fiber. In operation, the set of compressive elements is radially inwardly compressed, by the terminating element and the actuating element, into mechanical engagement with the buffered or unbuffered optical fiber closely adjacent its entry into the forward passage section.

According to the method of the invention, a fiber optic cable is seated in the passage of the terminating element. A portion of the fiber, either buffered or unbuffered, extends through the compressive system and through the first forward section of the passage of the terminating element. The compressive system is compressively formed in a radial inward direction by forces created by the axial telescopic assembly of the actuating element with the terminating element. The actuation of the compressive system compresses it into supporting and retaining engagement with the optical fiber. Preferably, the compressive system is maintained in its clamping condition.

The foregoing features of the invention, and others described below, provide a fiber optic cable termination that does not require adhesive and that yet terminates a fiber optic cable readily and with high reliability. The invention can be practiced economically and hence cost competitively with existing practices and structures, and can provide high quality communication and mechanical performance at least comparable with existing terminations that employ epoxy or other adhesives.

Although the invention thus provides a fiber optic termination that is secure, precise and reliable solely by mechanical action, and applied at room temperature without requiring adhesive, features of the apparatus and of the method of the invention may be used to advantage together with adhesives, and the invention has corresponding scope.

DETAILED DESCRIPTION OF THE DRAWINGS

For a fuller understanding of the nature and objects of the invention, reference should be made to the following detailed description and the accompanying drawings, in which:

FIG. 1 is a cross-sectional side view of an optical fiber termination according to the invention in unassembled form;

FIG. 2 is a view similar to FIG. 1, with the actuating element partially assembled with the terminating element sufficiently to initially deform the compressive system;

FIGS. 6, 7 and 8 are perspective views of three different compressive systems in accordance with the invention;

FIG. 9 is a side view, partially cut away, of another fiber optic cable termination according to the invention and in fully assembled form; and FIG. 10 is a side view, partially cut away, of another fiber optic cable termination according to the invention in partially assembled form.

DESCRIPTION OF THE ILLUSTRATED EMBODIMENTS

Figure 3:
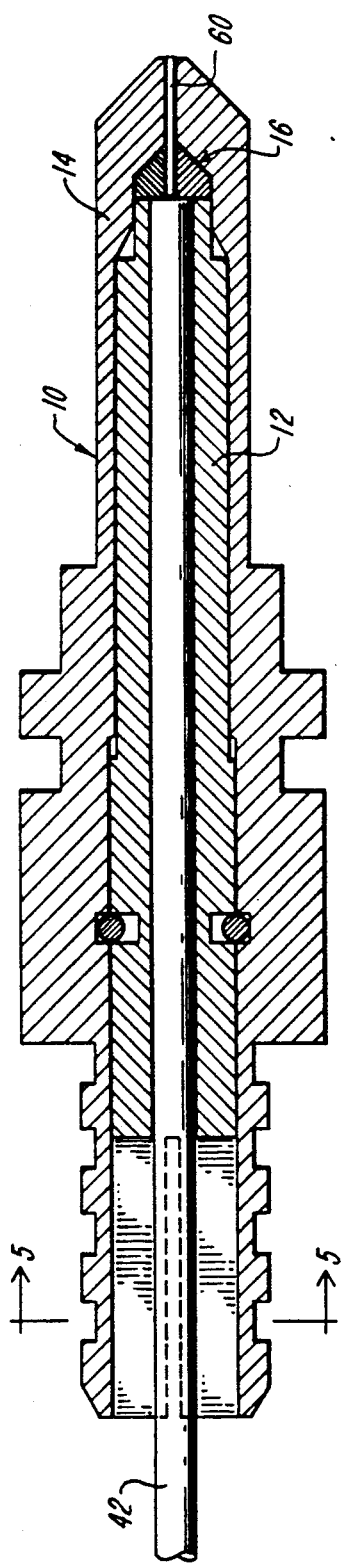
FIG. 3 is a side view similar to FIGS. 1 and 2 of the termination fully assembled.

A fiber optic termination 10 according to the invention, shown in FIGS. 1 through 3, has an outer, terminating element 14, an inner, actuating element 12, and a compressive system 16 illustrated on having a set of three compressive elements 17.

The illustrated outer element 14 is a tubular housing body that has an axial through passage 18 concentric about an axis 25 with a forward outer surface 26. The tubular passage 18 has a first section 20, illustrated as dimensioned for receiving and for supporting and positioning an unbuffered optical fiber 60. The first passage section is axially forward of a second passage section 22. This rear passage section 22 is dimensioned to telescopically receive and seat the inner element 12. A radial constriction forms a shoulder or abutment 24 at the back, rear end of the forward passage section 20 and forward of the passage section 22. The illustrated radial constriction is a right circular cone concentric with the axis 25 of the passage 18. The outer surface of the terminating element body is illustrated as having an axial succession of lands 34 and grooves 32 at the axial back end to receive and engage a cable-supporting sheath or sleeve, as conventional. The forward outer surface 26 is structured as a cylindrical plug to seat telescopically in conventional fashion in a mating receptacle termination (not shown), and the central portion 27 of the outer surface is structured to provide conventional mechanical connection with such a receptacle.

The illustrated second passage section 22 has, spaced apart in axial succession, a conical deflecting guide surface 28, an outward step 29, and a locking groove 30, all rearward of the radial constriction element 24. The illustrated passage 18 also has a short bore 31 between the elements 24 and 28. The guide surface 28 forms a funnel, preferably with a cone angle in the order of 60°, and having a forward diameter less than the composite diameter of compressive system 16 prior to being compressed. The locking groove 30 is positioned to receive and seat a lock ring groove 58 carried on the inner element 12, when the termination 10 is completely assembled, as in FIG. 3.

With further reference to FIGS. 1, 2 and 3, the illustrated inner, actuating element 12 has an tubular axial through passage 38 concentrically within a outer surface 40, and has a compressively acting axially forward surface 44. The passage 38 is adapted to receive and support a buffered optical fiber cable 42. The illustrated tubular outer surface 40 has a front section 46 that matingly fits within the terminating element bore 31, a larger middle section 48 that matingly fits within the passage 22 forward of the step 29 and rearward of the guide surface 28, and a still larger back section 50 that matingly fits with the passage 22 behind the step 29. Preferably, the radial steps between the sections 46 and 48, and further between the sections 48 and 50, are located in the fully assembled termination, FIG. 3, in close axial proximity rearward of the guide surface 28 and of the step 29, respectively, of the outer element 14. Outer surface 40 also preferably includes a locking ring groove 56, located rearward of step 50, that seat the expandable locking ring 58.

Figure 5:
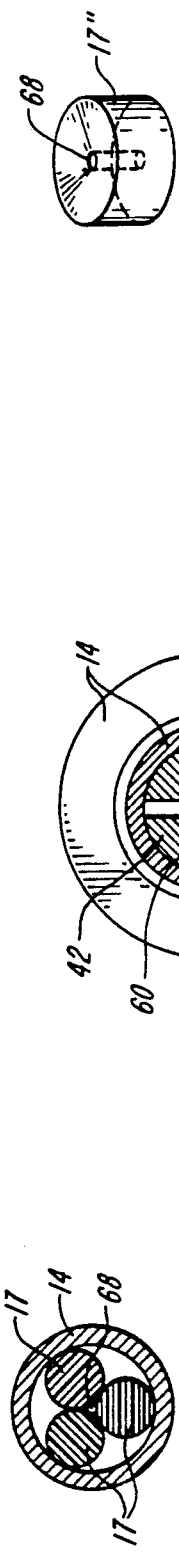
FIG. 5 is a transverse cross-sectional view along line 5—5 of FIG. 3.
Figure 4:
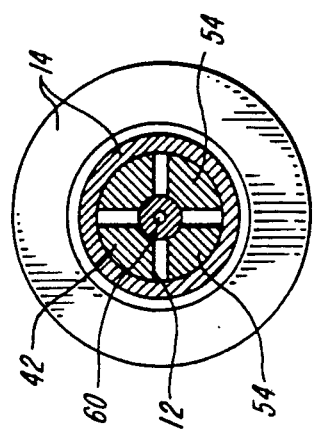
FIG. 4 is a transverse cross-sectional view along line 4—4 of FIG. 1.

As partially shown in FIGS. 4 and 5, the outer surface sections 46, 48 and 50 of the actuating element; and the sections 20 and 22 and bore 31 of the passage 18, as well as the forward outer surface 26, all are cylindrical, with circular cross sections, and, together with the fiber passage 68, are coaxial with the axis 25.

The illustrated termination 10, which engages a fiber optic cable with the compressive system 16 at the forward end of the termination, i.e. right-most in FIG. 3, also engages the cable at the rearward end of the termination, i.e. left-most in FIG. 3. This second engagement is provided by clamping members 54, at the rear end of the inner, actuating element 12. These clamping members are actuated by interferingly engaging the walls of passage 18. The illustrated clamping members 54 are formed with a rearmost section 52 on the inner element 12. Section 52 has an enlarged outer diameter, axially rearward of a step 53, illustrated as between the lock-seating groove 56 and the back end of the inner element. The step 53 preferably is gradual, e.g. tapered. Axial slots through the tubular wall of this largest diameter section 52 of the inner element 12, as shown in the upper portion of FIG. 1 and in FIG. 5, form four clamping fingers 54 in the embodiment shown. The enlarged outer diameter of these fingers interferingly fits within the passage 18, to compress the fingers onto the buffered cable as the termination is assembled.

Figure 6:
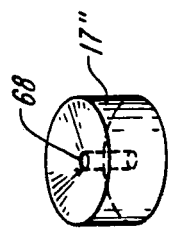

The compressive system 16 of the termination 10 can include a single, centrally apertured deformable element such as the spherical element 17' of FIG. 8 or as the disk element 17" of FIG. 6. The further embodiment of FIGS. 1 through 4 employs a set of three spherical elements 17 arranged in a circle to defined a fiber-receiving hole 68 between them. In other embodiments, the compressive system 16 can include three rod-like elements 17''' as shown in FIG. 7. To ensure that each compressive element 17 maintains substantially uniform holding pressure on an optical fiber or cable, it is preferably constructed of a homogeneous and resiliently pliable, elastomeric material that retains the memory of its undeformed shape. Examples of such a material include nylon, delrin, polyethylene, polypropylene, rubber, and polyvinyl chloride. The initial shape of the elements 17 may be of various configurations per FIGS. 4, 6, 7 and 8, and, preferably, has a circular cross-section, as shown. The fiber passage 68, passing through or among element(s) 17 receives an unbuffered optical fiber 60, as FIG. 2 shows. Prior to compression, the fiber passage 68 has a diameter sufficient to allow free movement of the optical fiber. The size and shape of the fiber passage 68 may be altered by varying the number, diameter, and/or shape of the elements 17. Further, the compressive system 16 preferably has a tapered opening to the passage 68 to guide insertion and passage of the optical fiber. A system 16 of three spheres provides such a fiber guide, as shown in FIG. 1. If a one-piece compressive system 16 as in FIGS. 6 or 8 is used, it is preferred that the ends of the fiber passage 68 therein be flared to guide the optical fiber as also shown.

FIGS. 1 through 3 illustrate, in sequence, the process of the invention with a cable connector having the described structure. As shown in the upper portion of FIG. 1, a buffered fiber optic cable 42 is seated within the passage 38 of the inner element 12, and the unbuffered and clad optical fiber 60 of the cable extends beyond the compressively acting surface 44 of the inner element 12. The compressive system 16 is assembled with the cable 42, as by sliding it over the fiber 60 prior to assembly with the outer terminating element 14. An alternative step to place the compressive system 16 within passage 18 of the outer, terminating element 14 at the forward end of the second passage section 22, as shown in the lower portion of FIG. 1.

The inner element 12 is telescoped into the outer element 14, as shown in FIG. 2, with the unbuffered optical fiber 60 passing through the clearance hole 68 and through the forward passage section 20 of outer element 14, to project axially beyond the termination element 14. After the termination elements 12, 14 and 16 are partially assembled and aligned in this manner with each other and with the cable 42, further axial assembly of the inner element 12 with the outer element 14 includes compressing the compressive system 16 between the compressively acting surface 44 of inner element 12 and the guide surface 28 of the outer element 14. The guide surface 28 deflects the axial force exerted by compressively acting face 44, causing the compressive system 16 to deform radially inwardly and into initial mechanical engagement with the optical fiber 60.

Further assembly of the two termination elements presses the compressive system 16 axially into the bore 31, with continued compression radially inward onto the fiber 60. The inner and outer elements 12 and 14 thus function like a piston within a cylinder respectively, and compress the set of elements of the compressive system onto the fiber 60.

Concurrently the greater diameter of inner element 12 rearward of step 53 produces a compressive engagement between the inner element 12 section 52 and the outer element 14, and deflects the fingers 54 concentrically inward onto cable 42.

The inner element 12 telescopes into the outer element 14 until locking grooves 30 and 56 are aligned, at which point the locking ring expands and 58 engages the outer groove 58, as shown in FIG. 3. At this point, the assembled compressive system 16 mechanically engages the unbuffered optical fiber 60, for supporting and retaining the fiber 60 in a fixed position relative the outer surface of outer element 14. The passage 18 within the forward section 20 supportingly receives with minimal clearance the optical fiber tip that projects forward of the compressive system to align and position it with precision. Further, the compressively acting clamping fingers 54 secure the buffered clad optical cable 42 to the assembled termination elements 12 and 14.

The projecting optical fiber 60 is trimmed and polished, as known in the art, to complete the termination of the cable 42.

As also known in the art, a sleeve (not shown) may be positioned over the buffered optical cable 42, after final assembly of the termination 10, such that a portion extends over the lands 34 and grooves 32. The sleeve may then be crimped or otherwise secured in position.

FIG. 9 shows another termination 70 according to the invention that secures a buffered optical cable 72 in the manner described above with reference to FIGS. 1 through 8, except that the entire length of the fiber is buffered and a compressive system 74 is radially compressed onto the buffered cable, instead of onto an unbuffered fiber as in FIGS. 1 through 8. The termination 70 has an outer termination element 76 that telescopically receives an inner, actuating element 78 to press the compressive system onto the cable. The terminating element 76 accordingly has a forward passage section 80 that supportingly receives and locates the buffered cable. The remaining structure and its function, and the termination method, for this embodiment can be in accord with the preceding description of the termination 10.

FIG. 10 shows another termination 82 according to the invention that secures an unbuffered optical fiber 84 in the manner described above with reference to FIGS. 1 through 8, except that a forward passage section 86 is formed using a ferrule 88. The ferrule 88 can be fabricated of a ceramic, stainless steel, or other suitable material familiar to those of ordinary skill in the art. The termination 82 has an outer termination element 90 that telescopically receives an inner, actuating element 92 to press a compressive system 94 onto the fiber 84. Termination element 90 includes a tubular housing body 98 and the ferrule 88. Tubular housing body 98 provides tubular passage 100 having a deflecting guide surface 102 and a forward short bore 104. The forward passage section 86 and outer dimension 106, of ferrule 88, are coaxial with an axis 108 of tubular passage 100. In addition to forward passage section 86, ferrule 88 provides radial constriction element 110. Termination element 90 is fabricated by press fitting housing body 98 and ferrule 88 together. The remaining assembly, structure and its function, for this embodiment can be in accord with the preceding description of the termination 10.

It will thus be seen that the invention efficiently attains the objects set forth above. In particular, the invention provides a termination assembly that is readily installed without requiring heat or adhesives, and that is substantially immune to environmental conditions. This apparatus and the method of the invention hence can provide a high performance, mechanically secured termination for optical fibers, without damaging the light transmissive path.

It will be understood that changes may be made in the above constructions and in the foregoing steps and sequences of operation without departing from the scope of the invention. It is accordingly intended that all matter contained in the above description or shown in the accompanying drawings be interpreted as illustrative rather than in a limiting sense.

Having described the invention, what is claimed as new and secured by Letters Patent is:

1. Apparatus for terminating a fiber optic cable by mechanical engagement, said apparatus comprising:
   A. A terminating element having a passage extending axially therethrough, said passage having a first forward section axially forward of and coaxial with a second rearward section, said passage being adapted for receiving a buffered optical fiber extending axially therein with a forward portion of said optical fiber extending within said forward section,
   B. a compressive system disposed within said passage for engagement circumferentially about said forward portion of said optical fiber, said compressive system being radially inwardly deformable, and
   C. selectively movable actuating means axially slidably movably seated relative to said terminating element and arranged for radially inwardly deforming said compressive system within said passage into engagement with said forward portion of said optical fiber.

2. Apparatus according to claim 1 further comprising radially-acting clamping means for selectively radially-inwardly engaging the buffered optical fiber within said rearward passage section.

3. Apparatus according to claim 1 in which said first passage section is arranged for telescopically receiving and supporting and locating an unbuffered optical fiber.

4. Apparatus according to claim 1 in which said first passage section is arranged for telescopically receiving and supporting and locating a buffered optical fiber cable.

5. Apparatus according to claim 1 in which said compressive system includes a set of at least one elastically deformable plastic elements seated within said terminating element passage radially outward from a fiber-receiving axial passage.

6. Apparatus according to claim 5 in which said compressive system comprises a single element of said elastically deformable resilient material having an aperture therethrough for forming said fiber-receiving passage.

7. Apparatus according to claim 5 in which said compressive system comprises a plurality of substantially identical compressive elements, each of said elastically deformable resilient material, seated within said passage.

8. Apparatus according to claim 1
   A. further comprising radially extending shoulder means within said passage located axially between said first and second passage sections for disposition in abutment with said compressive system, and
   B. in which said actuating means is selectively movable relative to said shoulder means for compressing said compressive systems therebetween to effect said inward deformation.

9. Apparatus according to claim 8
   A. in which said actuating means has a radially-extending actuating surface for disposition in abutment with said compressive system at least partially in opposition to said shoulder means, and
   B. in which at least one of said shoulder means and said actuating surface is angled for deflecting said compressive system radially inward during said inward deformation.

10. Apparatus according to claim 1 in which said actuating means comprises a tubular element slideably seated within one said passage section.

11. Apparatus according to claim 10 further comprising means for securing said tubular element of said actuating means in a selected location relative to said passage of said terminating element.

12. Apparatus according to claim 10
    A. in which said tubular element has an outer surface with a third forward section axially forward of and coaxial with a forth rearward section, said tubular element being arranged for telescopically fitting within said rearward second passage of said terminating element,
    B. said tubular element having resilient clamping means at said fourth rearward section thereof arranged for slidingly interferingly engaging a second passage section for effecting said compressive radially inwardly engaging clamping of an optical fiber within said second rearward passage section.

13. Apparatus according to claim 1
    A. further comprising radially-extending shoulder means within said passage for disposition in abutment with said compressive system,
    B. in which said actuating means comprises a tubular element slideably seated within one said passage section and having an actuating surface for disposition in abutment with said compressive system at least partially opposite said shoulder means, said actuating means being movable relative to said shoulder means for compressing said compressive systems therebetween to effect said inward deformation, and C. at least one of said shoulder means and said actuating surface being angled for deflecting said compressive system radially inward during said inward deformation thereof.

14. Apparatus according to claim 1
A. in which said actuating means comprises a tubular element slideably seated within said rearward passage section, and
B in which said tubular element of said actuating means includes radially acting clamping means for disposition within said passage for selective radially inward engagement with a buffered optical fiber within said rearward passage section concurrent with said inward deformation of said compressive system.

15. Apparatus according to claim 14 further comprising means for selectively securing said tubular element of said actuating means in a selected axial location within said passage for maintaining said compressive system inwardly deformed and for maintaining said clamping means in said compressive inward engagement.

16. Apparatus according to claim 8 in which said compressive system comprises centrally apertured elastically deformable resilient material seated within said passage with said aperture thereof coaxial with said passage axis and in abutment with said shoulder means, and elastically deformable radially inward in response to compression by said actuating means.

17. Apparatus according to claim 1, in which said compressive system includes three elastically deformable plastic elements seated within said terminating element passage radially outward from a fiber-receiving axial passage, said three deformable plastic elements having, in the absence of deformation, substantially identical circular cross-sections in a plane extending perpendicular to the axial extension of said passage and being arranged with said circular cross-sections symmetrically disposed about said fiber-receiving axial passage.

18. Apparatus according to claim 17, in which said three deformable plastic elements are identically spherical in shape.

19. Apparatus for terminating a fiber optic cable by mechanical engagement and comprising:
A. an inner element having an axially extending tubular passage therethrough concentrically within a tubular outer surface, said inner passage being adapted for receiving a buffered optical fiber and having a compressively acting surface at a first forward end,
B. an outer terminating element having an axially extending tubular passage therethrough with radial constriction means between a first forward passage section for receiving an optical fiber and a second passage section, said inner element being telescopically received in said second passage section and being axially slidable therein, and
C. a compressive system disposed in said section passage section of said outer terminating element axially forward of said compressively-acting surface for encircling an optical fiber received in said passage of said inner terminating element, said compressive system being elastically deformable, upon compression between said constriction means and said compressively-acting surface, from a first shape to a different second shape for compressively engaging the optical fiber.

20. Apparatus according to claim 19 further comprising means for fixing said inner element at a selected relative axial position within said outer element.

21. Apparatus according to claim 19 wherein said inner terminating element further comprises compressively-acting clamping means at a rearward end for mechanically engaging the buffered fiber optical cable.

22. Apparatus according to claim 19 wherein said tubular passage of said outer element comprises a first deflectively acting surface adjacent the first forward passage section for deflecting said compressive system radially inward.

23. Apparatus according to claim 22 wherein said tubular passage of said outer element further comprises a second deflectively acting surface, rearwardly axially spaced from said first deflectively acting surface, for partially deflecting said compressive system radially inward.

24. Apparatus according to claim 19 wherein said outer terminating element comprises a ferrule means, said ferrule means forming said radial constriction means and said first forward passage section.

25. A method for terminating a fiber optic cable by mechanical engagement, said method comprising the steps of
A. providing a terminating element having axially-forward wall means and having an axially extending tubular passage therethrough, and wherein said passage is arranged for receiving a buffered optical fiber extending axially therein with a portion of said fiber extending therefrom within said passage at said forward wall means,
B. providing a compressive system disposed within said passage for substantially encircling said portion of said optical fiber closely adjacent the passage thereof through said forward wall means, said compressive system being radially inwardly deformable from a first shape to a different second shape,
C. seating a buffered optical fiber extending axially within said passage and said portion of said optical fiber extending therefrom within said passage within said forward wall means, and
D. deforming said compressive system to said second shape, using axially applied forces, radially inward into supporting and retaining engagement with said portion of said optical fiber closely adjacent to the passage thereof through said forward wall means.

26. A method of claim 25 wherein said portion extending from said buffered optical fiber at said forward wall means comprises a buffered fiber optic cable.

27. A method of claim 25 wherein said portion extending from said buffered optical fiber at said forward wall means comprises an unbuffered fiber optic cable.

28. A method according to claim 25 comprising the further step of fixing said compressive system selectively in said radially inwardly deformed condition.

29. Apparatus for terminating a fiber optic cable by mechanical engagement, said apparatus comprising
A. a terminating element having a passage extending axially therethrough, said passage having a first forward section axially forward of and coaxial with a second rearward section, said passage being adapted for receiving a buffered optical fiber extending axially therein with a forward portion of said optical fiber extending within said forward section, B. a compressive system disposed within said passage for engagement circumferentially about said forward portion of said optical fiber, said compressive system being radially inwardly deformable from a first shape to a different second shape, and C. selectively movable actuating means movably seated relative to said terminating element and arranged for radially inwardly deforming said compressive system within said passage to said second shape and into engagement with said forward portion of said optical fiber.

30. Apparatus according to claim 29 further comprising radially-acting clamping means for selectively radially-inwardly engaging the buffered optical fiber within said rearward passage section.

31. Apparatus according to claim 29 in which said compressive system includes a set of at least one elastically deformable plastic element seated within said terminating element passage, said plastic element set defining a fiber-receiving axially passage and extending radially outward therefrom.

32. Apparatus according to claim 29

A. further comprising radially-extending shoulder means within said passage for disposition in abutment with said compressive system, B. in which said actuating means comprises a tubular element slidably seated within one said passage section and having an actuating surface for disposition in abutment with said compressive system at least partially opposite said shoulder means, said actuating means being movable relative to said shoulder means for compressing said compressive system therebetween to effect said inward deformation, and C. at least one of said shoulder means and said actuating surface being angled for deflecting said compressive system radially inward during said inward deformation thereof.

33. Apparatus according to claim 29

A. in which said actuating means comprises a tubular element slidably seated within said rearward passage section, and B. in which said tubular element of said actuating means includes radially acting clamping means for disposition within said passage for selective radially inward engagement with a buffered optical fiber within said rearward passage section concurrent with said inward deformation of said compressive system.

34. A method for terminating a fiber optic cable comprising the steps of providing a compressive system that substantially encircles a portion of the cable and that is compressively elastically deformable, and compressively deforming said compressive system by axially telescoping an inner terminating element within an outer element, so as to mechanically engage said compressive system radially inward with said portion of said cable.

35. A method according to claim 34

A. wherein said compressive deforming of said compressive system engages said fiber optic cable adjacent a forward end of the outer terminating element, and B. comprising the further step of mechanically engaging a buffered portion of said cable adjacent a rear end of the outer terminating element current with said compressive deforming.

* * * * *